June 30, 1964     J. B. BOWEN     3,139,299

REFUSE COLLECTOR

Filed June 25, 1962     2 Sheets-Sheet 1

INVENTOR.
JOHN B. BOWEN

BY

ATTORNEYS

June 30, 1964
J. B. BOWEN
3,139,299
REFUSE COLLECTOR
Filed June 25, 1962
2 Sheets-Sheet 2
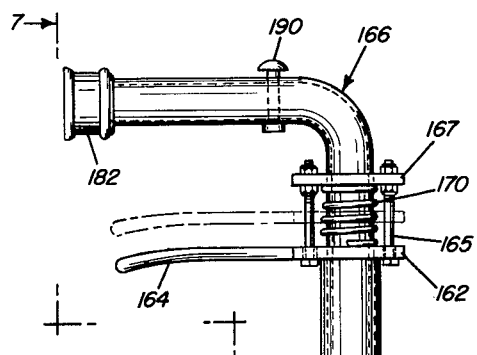
Fig.6
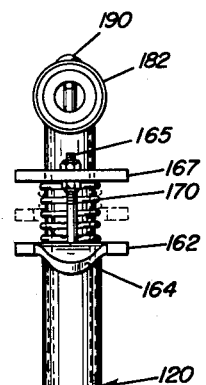
Fig.7
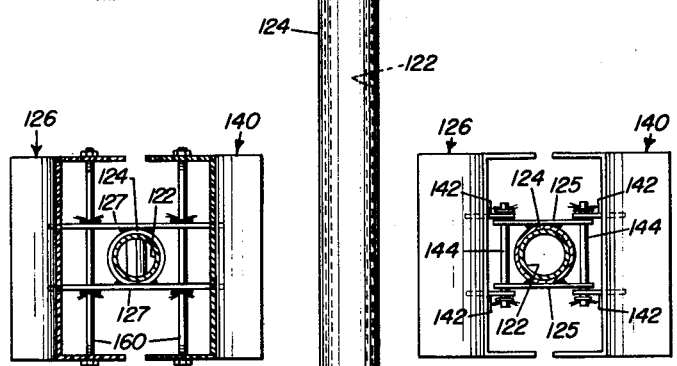
Fig.8    Fig.9
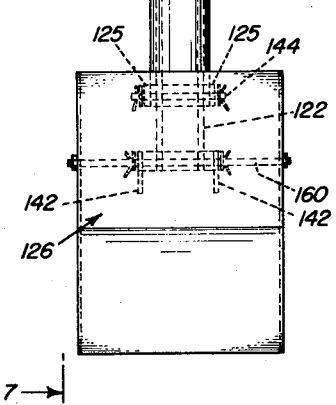
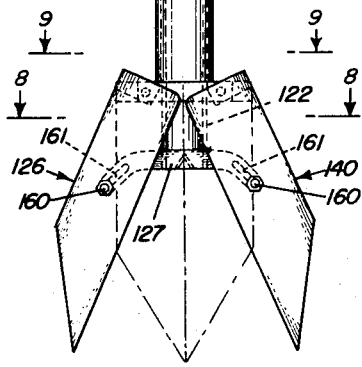
INVENTOR.
JOHN B. BOWEN
BY
ATTORNEYS United States Patent Office 3,139,299
Patented June 30, 1964

3,139,299
REFUSE COLLECTOR
John B. Bowen, 111 Alder, Coronado, Calif.
Filed June 25, 1962, Ser. No. 204,797
2 Claims. (Cl. 294—55)

The present invention relates to a refuse collector and more particularly to a refuse collector which can also be used as an apparatus for flushing the surface which was soiled by the refuse. More particularly, the present invention is directed to a collector for dung of pet animals and for flushing the surface after the refuse has been picked up.

The refuse collector of the present invention comprises two elongated main frames which are arranged in longitudinal sliding relationship with one another. A bowl is carried at the lower end of one of the frames and a scoop is pivotally connected to both of the frames and is so arranged that when one of the frames is moved manually longitudinally relative to the other, the scoop pushes the refuse into the bowl. A spring is disposed between the frames for yieldingly urging one of the frames longitudinally of the other whereby the scoop and bowl are yieldingly urged away from one another, namely to open position.

One of the frames is in the form of a tube which can be coupled with, for example, a garden hose.

In one of the embodiments of the invention, the bowl is fixed to one of the frames and in another embodiment the scoop is also in the form of a bowl.

Other features and the advantages of the present invention will be apparent from the following description, reference being had to the acompanying drawings wherein preferred embodiments of the invention are shown.

In the drawings:

FIG. 6 is a view similar to FIG. 1 but showing another aspect of the invention.

FIG. 7 is a view taken along line 7—7 of FIG. 6.

Figure 1:
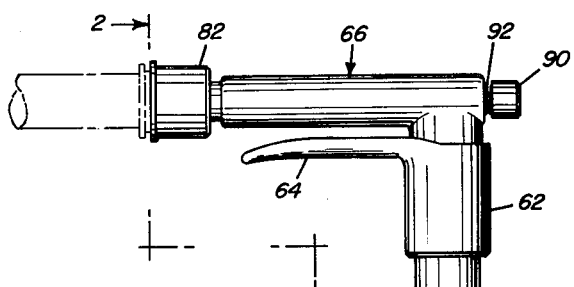
FIG. 1 is a side view of the refuse collector and flushing apparatus, showing the same connected to a garden hose, the garden hose being shown in dot and dash lines.
Figure 2:
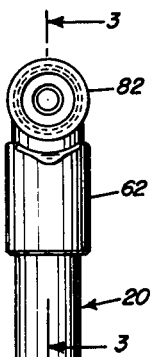
FIG. 2 is a view looking in the direction of arrows 2—2 of FIG. 1.

FIGS. 8 and 9 are sectional views taken along lines 8—8 and 9—9, respectively, of FIG. 7.

Referring more in detail to the drawings, the collector 20 includes two elongated main frames in the form of an inner tube 22 and an outer tube 24. These tubes are in telescopic relationship and extend vertically. In the embodiment shown in FIGS. 1 to 5 inclusive, a bowl 26 is carried by the lower end of the outer tube 24. This bowl and tube may be fastened to one another in any suitable manner. The bowl includes an upwardly extending rear wall 28, two side walls 30 and 32 and an upwardly and outwardly extending bottom wall 36 having a lip 38 at the lower end thereof.

A scoop 40 is provided with plurality of ears 42 which are pivotally attached to the upper portion of the bowl 28 by a pair of trunnions 44. This scoop is provided with an upwardly extending rear wall 46 and side walls 48 and 50 and a downwardly and inclined lower portion 54 which terminates at the lower end into a lip 56. The lip 56 is attached to complement the lip 38 of the bowl 26 and the side walls 48 and 50 of the scoop are arranged to abut the side walls 30 and 32, respectively, of the bowl 26.

The lower end of the inner tube 22 is provided with a hole 58 which receives a horizontally extended bead 60 formed integrally with the upper portion of the scoop 40. The bead 60 forms a pivot for pivotally attaching the scoop 40 to the lower end of the inner tube 22. It will be seen that when the inner tube 22 is moved upwardly, the bead 60 will be pulled upwardly, causing the scoop to pivot about the trunnions 44, and, when the inner tube is moved downwardly, scooping movement is imparted to the scoop 40.

The upper end of the outer tube 24 has a fixture 62 suitably affixed thereto. This fixture 62 is hollow and receives the upper end of the inner tube 22. The fixture 62 is provided with a laterally extending handle 64. The upper end of tube 22 has a fixture 66 affixed thereto. This fixture 66 is hollow and in the form of an elbow. The upper end of the inner tube 22 is fixed to a vertically extending portion 68 of the fixture 66. A coil spring 70 is interposed between the portion 68 of the fixture 66 and a seat 72 on the fixture 62 and normally tends to force the inner tube upwardly, thereby normally tending to move the scoop 40 to its open portion with respect to the bowl 26. The fixture 66 includes a horizontally extending portion 74. When the handle portion 64 and the handle portion 74 are moved toward one another, the scoop is moved to closed position.

Figure 3:
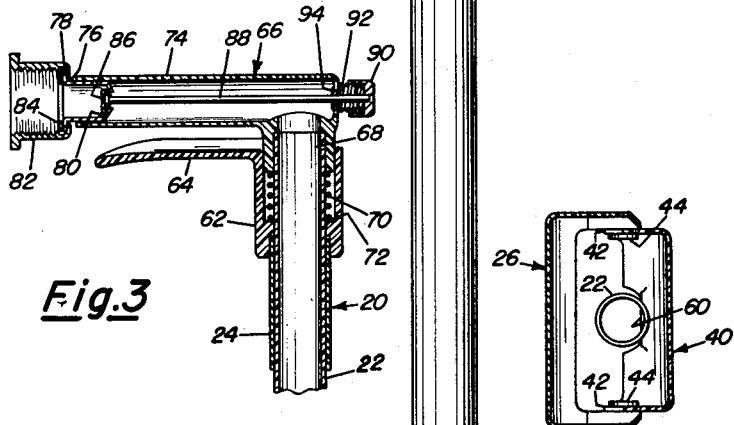
FIG. 3 is a sectional view taken along the lines 3—3 of FIG. 2.
Figures 4, 5:
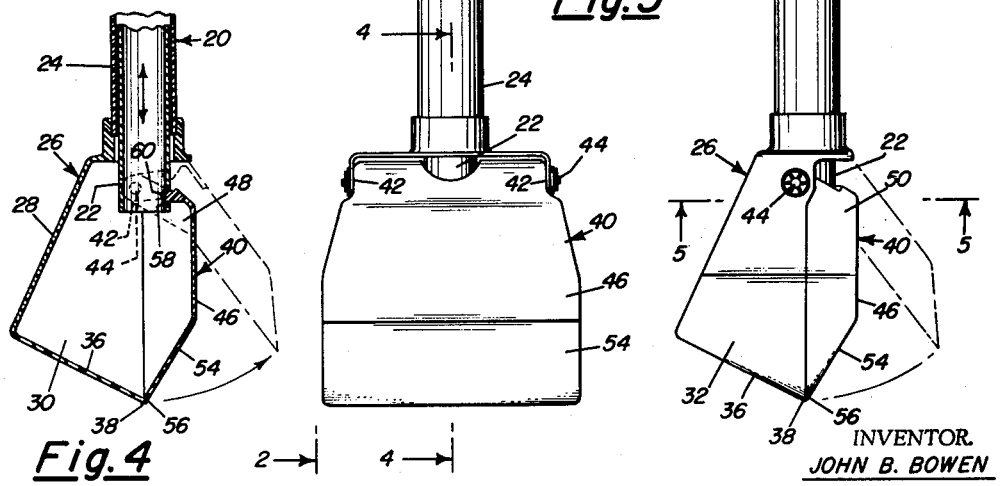
FIG. 4 is a sectional view taken along the lines 4—4 of FIG. 1.
FIG. 5 is a sectional view taken along the line 5—5 of FIG. 2.

As viewed in FIGS. 1 and 3, the left end of the handle 74 of fixture 66 carries a combination coupling retainer and valve seat portion 76. A coupling retainer is formed by a flange 78 and the seat portion is shown at 80. A coupling 82 is rotatably mounted on the retainer 76 for ready connection with a garden hose. The standard rubber washer 84 is provided for this purpose.

A valve 86 cooperates with the seat portion 80 for controlling the flow of water to the fixture 66. This valve is carried by a valve stem 88 which extends through the right end of fixture 66 and is opened by a push button 90 against the tension of a spring 92. The valve stem is sealed by a grommet 94. It will be seen that when the push button 90 is moved to the left, water can flow through the fixture 66 and into the inner tube 22. By manipulating the handle 64, to actuate the scoop 40, the water emanating from the bottom of the refuse collector can be directed and diffused as desired.

Referring now to the embodiment shown in FIGS. 6 to 9 inclusive, the collector is shown at 120 including an inner tube 122 and an outer tube 124. A handle 164 is suitably attached to the upper end of the outer tube 124 by a collar 162 and is guided by bolts 165. The bolts are fastened to a collar 167 on a fixture 166. A coil spring 170 is interposed between the collars 162 and 167 and normally tends to move the fixture 166 upwardly. The left end of the fixture 166 is provided with a coupling 182 for attaching the same to a garden hose. A suitable valve is disposed within the fixture 166 for controlling the flow of water therethrough and into the tube 122. This valve is actuated by a push button 190.

Two bowls 126 and 140 are employed in this embodiment, both of which function as bowls and scoops. The lower end of the outer tube 124 is provided with two brackets 125. These brackets are disposed on opposite sides of the outer tube 124 and may be secured by welding. These brackets carry pivot pins 144. The bowls or scoops 126 and 140 are provided with ears 142 which are pivotally carried by the pins 144 whereby the scoops 126 and 140 can be swung outwardly or toward one another, similar to grapplings. The lower end of the inner tube 122 carries parallelly arranged brackets 127 which may be secured thereto as by welding. The ends of these brackets 127 carry horizontally extending pins 160 which are arranged to slide within slots 161, which slots are disposed at such an angle that when inner tube 122 is moved downwardly with respect to the outer tube 124, the lower end of the scoops 126 and 140 are closed and conversely, when the inner tube 122 is pulled upwardly with respect to the outer tube 124, the lower ends of the scoops are moved away from one another.

In either embodiment the scoop is or scoops are actuated manually for picking up the refuse. A suggested manner of carrying out the cleaning operation is to dump the refuse in a bag immediately after it is picked up and then by pushing on the water controlling button, the soiled place can be flushed so as to clean the bowls and scoops and wash the areas which were dirtied.

While the forms of embodiment herein shown and described constitute preferred form, it is to be understood that other forms may be adopted falling within the scope of the claims that follow.

I claim:
1. A refuse collector, comprising in combination:
   (A) An elongated and vertically extending tube element, said tube having an outlet at the bottom thereof;
   (B) an elongated element in longitudinal sliding relationship and supported by the tube element, one of said elements being rigid and having a handle section for manipulating the collector;
   (C) a bowl carried by and at the lower end of one of said elements;
   (D) a scoop for the bowl;
   (E) means for pivotally connecting the scoop to both of said elements;
   (F) means coupling the upper end of the tube with a source of fluid;
   (G) and a manually actuated valve carried by the tube for controlling the flow of fluid through the tube.
2. A refuse collector as defined in claim 1, characterized in that the tube element forms the handle section.

References Cited in the file of this patent
UNITED STATES PATENTS

| | | |
|---|---|---|
| 507,826 | Miller | Oct. 31, 1893 |
| 2,195,765 | Caulk | Apr. 2, 1940 |
| 2,230,498 | Loos et al. | Feb. 4, 1941 |